No. 663,282. Patented Dec. 4, 1900.
J. J. KRESS.
HOSE WASHER.
(Application filed May 10, 1900.)
(No Model.)
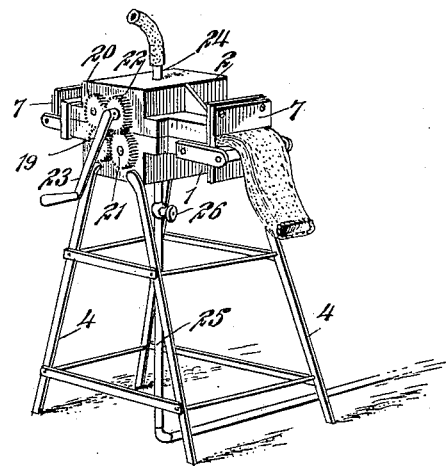
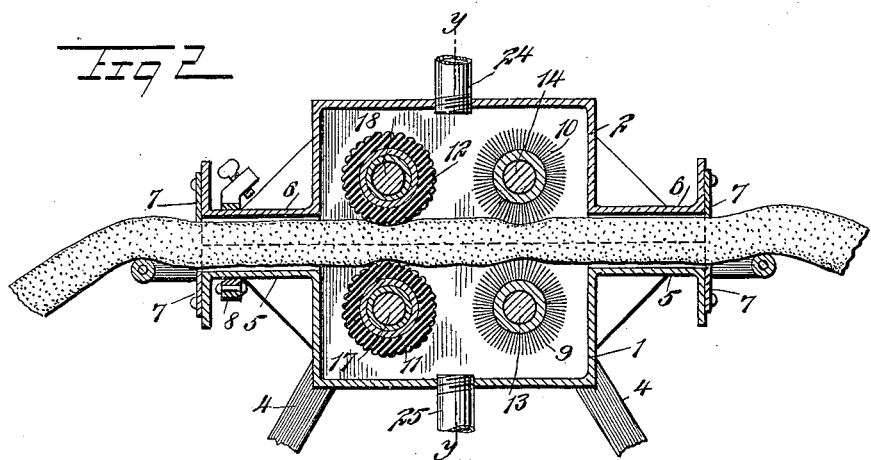
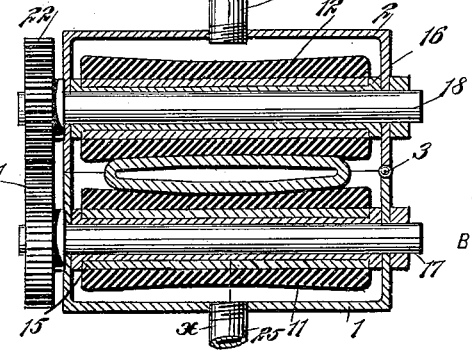
WITNESSES:
INVENTOR
John J. Kress.
BY
ATTORNEYS

UNITED STATES PATENT OFFICE.

JOHN JOSEPH KRESS, OF PERTH AMBOY, NEW JERSEY.

HOSE-WASHER.

SPECIFICATION forming part of Letters Patent No. 663,282, dated December 4, 1900.

Application filed May 10, 1900. Serial No. 16,210. (No model.)

*To all whom it may concern:*

Be it known that I, JOHN JOSEPH KRESS, a citizen of the United States, and a resident of Perth Amboy, in the county of Middlesex and State of New Jersey, have invented a new and Improved Hose-Washer, of which the following is a full, clear, and exact description.

This invention relates to improvements in washing-machines for fire-engine and other hose; and the object is to provide a washer of simple construction that will thoroughly wash and clean the hose in a comparatively short time and through which a running supply of clean fresh water may be passed during the operation of washing the hose.

I will describe a hose-washer embodying my invention and then point out the novel features in the appended claims.

Reference is to be had to the accompanying drawings, forming a part of this specification, in which similar characters of reference indicate corresponding parts in all the figures.

Figure 1 is a perspective view of a hose-washer embodying my invention. Fig. 2 is a section on the line $x\ x$ of Fig. 3, and Fig. 3 is a section on the line $y\ y$ of Fig. 2.

The hose-washer comprises a boxing consisting of two sections 1 2, hinged together at one side, as at 3, whereby the upper section may be swung to an open or closed position with relation to the lower section 1. This lower section is connected to suitable supporting-legs 4. At the ends the sections 1 and 2 have outwardly-projecting portions 5 and 6, one providing an inlet for the hose and the other providing an outlet for the hose. Preferably on the ends of these projections scrapers 7 will be attached, these scrapers consisting of yielding material, such as rubber, designed to engage closely against the hose and to a great degree prevent the passage of water outward through the projections and at the same time scrape off any loose dirt that may be on the jacket of the hose.

When the parts are closed, they may be secured from opening by any desired means—such, for instance, as a clamping device 8.

Arranged in the sections 1 and 2 at the feed end are cylindrical bristle brushes 9 and 10, arranged one above the other, and at the outlet end of the said sections 1 and 2 feed and rubbing rollers 11 and 12 are arranged. These rubbing-rollers are longitudinally concaved, so as to conform to the shape of a hose as it passes through the machine, as indicated in Fig. 3, and they are also longitudinally corrugated, the projections not only serving to feed the hose through the machine, but serving to impart a rubbing motion thereto. The brushes 9 and 10 are respectively mounted on shafts 13 and 14, having journal-bearings in the side walls of the sections, and the rollers 11 and 12 are connected to sleeves 15 and 16, through which the shafts 17 and 18 pass, the said shafts also having bearings in the opposite walls of the boxing. The shafts and sleeves may preferably be made of a material not liable to corrosion—such, for instance, as bronze or galvanized iron.

On the outwardly-projecting ends of the shafts 13 and 14 and 17 and 18 are gear-wheels 19, 20, 21, and 22, the several gears meshing together and with one of which a turning device may be attached. For such turning device a crank 23 may be used when the machine is operated manually. It is to be understood, however, that the machine may be operated by any suitable motor.

Leading into the upper section 2 is a water-feed pipe 24, which may be connected to any suitable source of supply, and leading from the section 1 is a discharge-pipe 25, having a valve 26, and which may lead to a sewer or other place of discharge. As the several shafts are geared together, it is obvious that the brushes will rotate in an opposite direction to that of the feed-rollers, thus keeping a proper tension upon the hose rearward of the rollers.

In operation after inserting the end of the hose and turning on the water to fill the boxing motion is to be imparted to the machine by turning the crank 23. Of course as the hose is fed through it will be thoroughly scraped by the brushes and superfluous water will be squeezed out by means of the scrapers 7 at the outlet end of the machine. To keep the boxing full of water to completely cover the brushes and rollers, the outlet of the water should be less than the inlet. This may be regulated by means of the valve 26 in the outlet-pipe.

It will be seen that a machine embodying my invention is very simple in construction, having no parts liable to get out of order, can be made very light, so as to be easily moved from place to place, and can be operated by the expenditure of very little power.

Having thus described my invention, I claim as new and desire to secure by Letters Patent—

1. A hose-washing machine, comprising a boxing, consisting of two separable sections, cylindrical brushes arranged in the boxing one above the other, feed-rollers arranged in the boxing one above the other and forward of the brushes, gear connections between the shafts of the brushes and rollers, an inlet-pipe for water, and an outlet-pipe for water, having a valve to control the outlet, substantially as specified.

2. A hose-washer, comprising a casing, consisting of two sections hinged together and having outlet projections through which a hose may pass, flexible scraping devices on the outer ends of said projections, cylindrical brushes in the casing, feed-rollers in the casing, and means for rotating simultaneously the brushes and rollers, substantially as specified.

3. A hose-washer, comprising a boxing or casing, consisting of two parts hinged together, a brush journaled in each part, a feed-roller journaled in each part, the said feed-rollers being longitudinally concaved, means for supplying water to the boxing or casing, and means for rotating the brushes and rollers, substantially as specified.

4. In a hose-washer, a boxing or casing, rotary brushes arranged in said boxing or casing, and feed-rollers arranged in said boxing or casing, the said feed-rollers being longitudinally corrugated, substantially as specified.

5. A hose-washing machine, comprising a casing or boxing, rotary brushes arranged in said casing or boxing, feed-rollers in said casing or boxing, the said feed-rollers being longitudinally concaved and longitudinally corrugated, and gear connections between the shafts of the brushes and rollers, substantially as specified.

In testimony whereof I have signed my name to this specification in the presence of two subscribing witnesses.

JOHN JOSEPH KRESS.

Witnesses:
CONRAD F. HALL,
JOHN F. RIELLY.